United States Patent [19]

Roberts

[11] Patent Number: 4,821,630
[45] Date of Patent: Apr. 18, 1989

[54] SUN TEA ADAPTER FOR PLASTIC CARTONS

[76] Inventor: Robert E. Roberts, 2033 N. Sunset Dr., Apache Junction, Ariz. 85219

[21] Appl. No.: 182,410

[22] Filed: Apr. 18, 1988

[51] Int. Cl.⁴ .................. A47J 31/18; A47J 31/00
[52] U.S. Cl. .................................. 99/323; 206/0.5; 426/77; 426/84; 426/112
[58] Field of Search ............. 99/279, 275, 323, 323.1, 99/323.2, 276, 277.1, 316, 317, 318, 319, 320, 321, 322; 426/77, 84, 112, 124; 206/0.5

[56] References Cited

U.S. PATENT DOCUMENTS

| | | | |
|---|---|---|---|
| 1,489,806 | 4/1924 | Anderson | 426/77 |
| 2,086,073 | 7/1937 | Francescon | 99/277.1 |
| 3,657,994 | 4/1972 | Post | 99/323 |
| 3,942,423 | 3/1976 | Herzfeld | 99/277.1 |
| 4,345,512 | 8/1982 | Moore | 99/323 |

Primary Examiner—Robert W. Jenkins
Attorney, Agent, or Firm—H. Gordon Shields

[57] ABSTRACT

Sun tea adapter apparatus includes a relatively long cylinder for holding tea bags and having mesh sides and bottom and adapted to be inserted into a plastic carton, such as one gallon plastic milk cartons, to allow the plastic carton to be used for making sun tea. The adapter includes a top portion above the mesh cylinder, which substantially duplicates the top of the milk carton to enable the milk carton cap to be placed onto the top of the adapter. A second embodiment utilizes a wider mouthed plastic jar which may be specifically designed for the making of sun tea.

11 Claims, 1 Drawing Sheet

U.S. Patent  Apr. 18, 1989  4,821,630
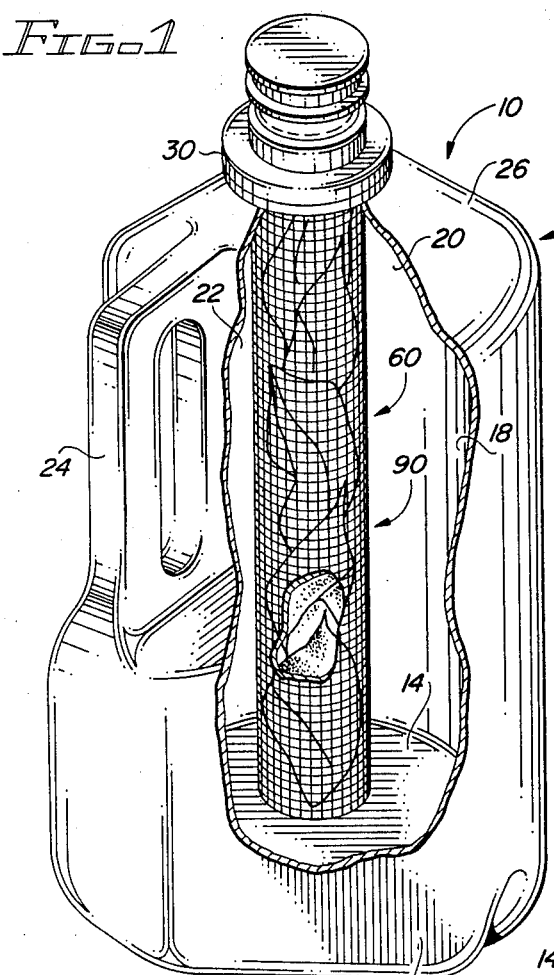
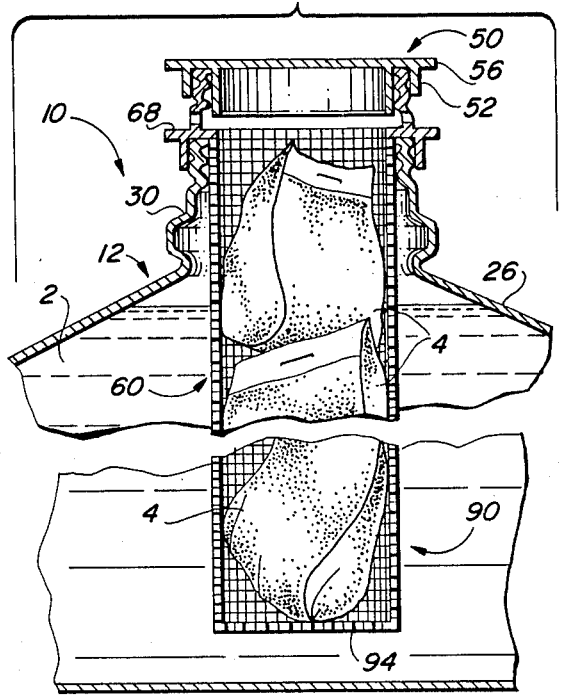
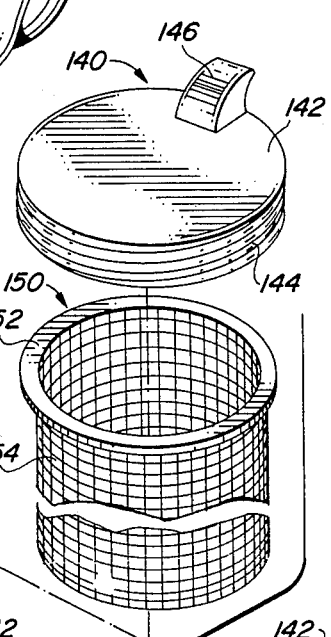
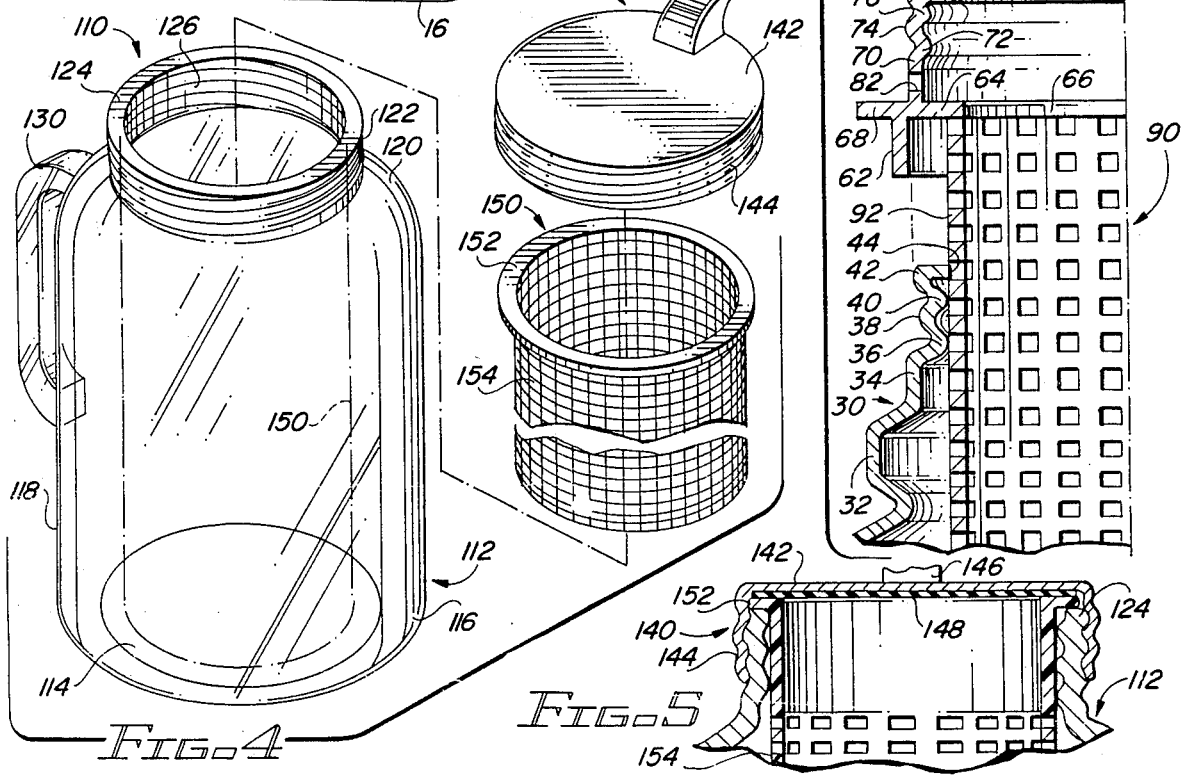

SUN TEA ADAPTER FOR PLASTIC CARTONS

BACKGROUND OF THE INVENTION

1. Field of the Invention

This invention relates to the making of sun tea, and more particularly to a cylindrical adapter for holding tea bags or the like on the inside of a plastic carton for making sun tea.

2. Description of the Prior Art

The making of sun tea in the prior art is generally accomplished by placing tea bags on the inside of a glass container, with string fastened to the tea bags extending out of the container and held in place by the container lid. The containers are glass, which typically hold about one gallon water/tea, and the containers are accordingly relatively heavy.

Accidents are not uncommon due to the combination of slippery glass and heavy water/tea. This, of course, is an undesirable occurrence.

The possibility of accidents, and the resulting problems with not only the slippage but also with the glass fragments, is a distinct limitation on the potential maker of sun tea.

As is well known and understood, sun tea is typically made by leaving the tea bags in the water out in the sun for several hours. Heretofore, only transparent glass containers have been used. As indicated above, the glass containers typically hold about a gallon, and usually are in the form of relatively wide-mouthed containers, such as are typically used commercially for containing mayonnaise and pickles. The wide-mouthed containers can also be purchased in grocery stores or variety stores for the purpose of making sun tea. They sometimes have decorative designs or words on the outside. However, these jars are relatively expensive to purchase.

With the inherent problems of glass, and the limited availability of glass containers, an alternative has been desirable. The apparatus of the present invention allows the use of plastic milk cartons, typically the one-gallon kind, to be used to make sun tea. Such containers are widely used and are relatively available, and of course, inexpensive.

An alternate embodiment provides a plastic jar with a relatively wide mouth, as opposed to the relatively narrow mouth of the milk carton, to be used to make sun tea.

SUMMARY OF THE INVENTION

The invention described and claimed herein comprises a cylindrical mesh adapter for holding a quantity of tea bags and extendable into a plastic milk carton or the like for making sun tea. The adapter includes an upper portion which substantially duplicates the top of the milk carton to enable the original cap to be placed on the adapter. The cylindrical portion has substantially the same outer diametter as the inner diameter of the mouth opening of the container so that while moving the adapter, the cylindrical portion is wiped relatively clean to prevent dripping, etc., when the adapter is removed from the carton.

Among the objects of the present invention are the following:

To provide new and useful apparatus for making sun tea;

To provide new and useful adapter apparatus for enabling plastic milk cartons to be used to make sun tea;

To provide new and useful cylindrical apparatus for holding a quantity of tea bags in a container for making sun tea;

To provide a cylindrical mesh adapter for holding tea bags on the interior of a container for making sun tea; and To provide new and useful adapter apparatus having a cylindrical portion for holding a quantity of tea and having an upper portion extending outwardly from the carton for securing a cap to the adapter.

BRIEF DESCRIPTION OF THE DRAWING

FIG. 1 is a perspective view of the apparatus of the present invention in its use environment.

FIG. 2 is an enlarged view in partial section of a portion of the apparatus of FIG. 1.

FIG. 3 is an enlarged view of a portion of the apparatus of FIG. 2.

FIG. 4 is an exploded perspective view of an alternate embodiment of the apparatus of FIGS. 1-3.

FIG. 5 is an enlarged view of a portion of the assembled apparatus of FIG. 4.

DESCRIPTION OF THE PREFERRED EMBODIMENT

FIG. 1 is a perspective view of sun tea apparatus 10 of the present invention. The sun tea apparatus includes a plastic jug or container 12 with a cylindrical adapter insert 60 disposed therein. The plastic jug or container 12 is a typical milk carton type jug, well known and understood by virtually any shopper. The jug 12 is generally of a rectangular configuration having a bottom 14, and four walls extending upwardly from the bottom. In FIG. 1 is shown a side wall 16, a side wall 18, a side wall 20, and a side wall 22. The side walls extend upwardly from the bottom 14.

An integral and typically hollow handle 24 extends upwardly from about the middle point of the juncture of the side walls 16 and 22. The handle continues upwardly to the juncture of the two side walls and extends generally inwardly to a sloping upper wall 26. The sloping upper wall 26 extends from the upper portion of the side walls 16-22 to a neck 30. The upper portion of the handle 24 joins the upper part of the sloping upper wall 26 adjacent to the neck 30.

All of the above description is generally standard for plastic milk cartons or jugs of the one-gallon variety. There are, of course, minor variations among manufacturers, but all of the one-gallon milk cartons or jugs are generally the same. Variations include various indentations on the sides for ornamental and for strength purposes, and ridges and/or indentations on the bottom, etc.

The neck 30 includes a bottom outer ridge 32. The outer ridge 32 comprises an outwardly extending ridge disposed generally adjacent to the upper portion of the sloping upper wall 26.

Above the ridge 32 is a relatively short cylinder wall 34. Above the cylindrical wall 34 is an indentation which comprises an inner ridge 36. As will be discussed in detail below, particularly with respect to FIG. 3, there is a significance to the inner ridge 36.

Above the inner ridge 36 is a middle outer ridge 38, and above the middle outer ridge 38 is an upper inner ridge 40. The upper inner ridge 40 is substantially aligned with the inner ridge 36. Thus, the inside diameter of the ridges 36 and 40 is generally identical.

As is best shown in FIG. 3, the ridges 36, 38, and 40 are simply corrugations in the neck 30.

The upper inner ridge 40 terminates at a top 42. A top opening or mouth 44 extends through the top 42. The inner diameter of the top opening or mouth 44 is substantially the same as the inner diameter of the inner ridges 36 and 40.

A cap 50 is typically disposed on the top of the neck 30, and extends down over the middle outer ridge 38. The outer diameter of the top 42 and the outer diameter of the middle outer ridge 38 are substantially identical. The cap 50 provides a friciton fit over the top 42 and the outer ridge 38.

The cap 50 includes an outer cylindrical portion 52 which extends downwardly from a circular top plate 54. The diameter of the top plate 54 is greater than the diameter of the cylindrical plate 52, and accordingly extends outwardly a slight distance beyond the cylinder 52 and provides an outer flange 56 that allows a user to easily remove the cap 50 from the jug 12.

An inner cylindrical portion 58 extends downwardly from the top plate 54 concentric with the outer cylindrical portion 52. The two cylindrical portions 52 and 58 are spaced apart a distance about equal to the combined widths of the top 42 and the adjacent ridges 38 and 40. When the cap is on the container 12, the cylindrical portions frictionally engage the top and the ridges to secure the cap to the neck 30 of the container.

The plastic jug 12 is converted to a sun tea container by means of a cylindrical adapter insert 60. The cylindrical insert 60 includes a relatively short outer cylinder 62, which is substantially the same in its inner diameter as the cylindrical portion 52 of the cap 50. The diameter of the cylindrical portion 62 accordingly is substantially the same as the outer diameter of the top 42 and the ridge 38. The cylindrical portion 62 provides a frictional lock or engagement with the neck 30 of the jug 12.

The cylindrical portion 62 extends downwardly from a top plate or rim 64. The top plate or rim 64 includes an aperture or hole 66. The aperture or hole 66 is generally centrally located with respect to the plate or rim 64. The plate or rim 64 also includes an outer flange 68. The flange 68 extends outwardly beyond the cylindrical portion 62.

The cylinder 62 corresponds to the cylinder 52 of the cap 50, and the flange 68 corresponds to the flange 56 of the cap 50. The plate 64 corresponds to the plate 54, except for the aperture 66. The plate 54 of the cap 50 does not, of course, include a corresponding aperture.

Extending upwardly from the plate 64 is a cylindrical portion 70. The cylindrical portion 70 corresponds, generally, to the cylindrical portion 34 of the neck 30. Above the cylindrical portion 70 are three ridges, a lower inner ridge 72, an outer ridge 74, and an upper inner ridge 76. Above the inner ridge 76 is a top 78. A top opening or aperture 80 extends through the top 78. An aperture 82, which is a vent hole, extends through the cylindrical portion 70. The outer diameter of the top 70, and the outer diameter of the ridge 74, are substantially identical, and they are also substantially identical to the outer diameter of the top 42 and the outer ridge 38 of the neck 30. The same is true with respect to the inner ridges 40 and 76. Accordingly, the cap 50 fits onto the top portion of the cylindrical insert 60 just as it does onto the top portion of the neck 30.

It will be noted that the overall length or height of the cylindrical portion 52 of the cap 50 is less than the overall height of the upper portion of the cylindrical adapter insert 60, so that the vent aperture 82 is open to the atmosphere to provide atmospheric pressure within the jug or container 12 when the cap 50 is placed on the top 78.

A mesh cylinder 90 extends downwardly from the plate 64 and about the aperture or opening 66. The mesh cylinder 90 includes a framework 92 with a plurality of apertures or openings so that water placed within the jug or container 12 has free access to tea bags, or the like, placed within the cylinder 90. The cylinder 90 comprises a framework 92 of a generally elongated cylindrical configuration. The openings or apertures in the framework are relatively large so that the framework is relatively open to provide virtually unrestricted contact and mixing between the water and the tea. The bottom of the cylindrical framework 92 is closed by a bottom 94, and the bottom 94 is also of mesh construction so that, again, water communicates freely with the interior of the cylinder 92.

In FIG. 2, the jug 12 is shown substantially filled with water 2. The cylinder 90 is shown with a plurality of tea bags 4.

The inner diameter of the top opening 44, and the ridges 40 and 36, as indicated above, are substantially identical. The outer diameter of the cylinder 90 is substantially the same as the inner diameter of the opening 44 and ridges 40 and 36. Accordingly, when the adapter insert 60 is removed from the jug 12, after the sun tea making process is completed, any residue from the tea bags 4 will be wiped clean from the cylinder as the cylinder is withdrawn. This cleaning effect prevents any dripping from the cylinder as the cylinder is removed.

FIG. 4 is an exploded perspective view of an alternate embodiment of the apparatus of the present invention. FIG. 5 is a view in partial section of a portion of the assembled apparatus of FIG. 4, illustrating the relationship among the various elements illustrated or shown in FIG. 4.

Alternate embodiment sun tea apparatus 110 of FIG. 4 includes three general elements, including a cylindrical jar or container 112, a lid or cap 140, and an insert or adapter 150. The cylinder or jar 112 is preferably made of clear plastic, but it could also be glass. The jar 112 includes a bottom 114, an upwardly and outwardly curved lower wall 116, which extends upwardly from the bottom 114. Extending upwardly from the lower wall 116 is a generally vertically extending cylinder wall 118. At the upper part of the cylinder wall 118 is an upwardly and inwardly curved upper wall 120. The curved upper wall 120 extends a relatively short distance to where it joins with an externally threaded upper cylinder wall 122. The upper wall 122 terminates in a relatively flat top 124. Within the upper wall 122, and within the top 124, is a mouth 126.

As is well known and understood, cylindrical jars, such as the jar 112, are rather difficult to handle when they are filled with a liquid. Since water weighs more than eight pounds per gallon, the likelihood of an accident is substantial over a period of time. Thus, the utilization of an external handle, such as handle 130, is highly desirable. The handle 130 may be an integral handle, or it may be an add-on handle, such as a plastic handle appropriately secured to the jar 112 through an appropriate harness, etc.

It will be appreciated that the inner diameter of the mouth 126 is substantially greater than the inner diameter of the neck 30 of the jug 12. Accordingly, both the lid or cap 140 and the cylinder or adapter 150 are substantially different from the cap 50 and the insert or adapter 90, which are the corresponding elements in the sun tea apparatus 10.

The lid 140 includes a flat top plate 142, a threaded portion 144 which extends downwardly from the top 142, and a spout 146. The spout 146 extends upwardly and outwardly from the top 142 and is disposed adjacent to the juncture of the top 142 and the downwardly depending threaded portion 144. The spout 146, in addition to comprising a pouring element, also acts as a vent for providing atmospheric pressure within the container or jar 112.

It will be noted that, thus far, with the exception of the handle 130, and the spout 146 of the cap 140, the jar apparatus 110 and the lid or cap 140 could fit man large glass or plastic jars, such as are typically used as containers for mayonnaise products, pickles, etc.

Since tea, or the like, is to be poured from the jar 112, and through the spout 146, a sealing gasket 148 is used to seal the lid or cap 140 to the insert 150 and to the jar 112. The gasket 148 is shown in FIG. 5.

The insert or adapter 150 includes a top rim 152 which extends radially outwardly from a mesh cylinder 154. The rim 152 is disposed on the top 124 of the upper wall 122. The mesh cylinder 154 is substantially identical to the mesh cylinder 90 in general structure. However, the outer diameter of the cylinder 154 is substantially greater than that of the cylinder 90. The outer diameter of the cylinder 154 is substantially the same as the inner diameter of the mouth 126. Accordingly, as the insert 150 is removed from the jar 112, any residue from tea bags or the like, disposed within the insert 150, is wiped clean through the withdrawal action. This is, of course, substantially the same as the withdrawal or removal action and the cleaning or wiping process described above in conjunction with the insert 60 and the neck 30.

The mesh cylinders 90 and 154 have been discussed in terms of a relatively open mesh, or a mesh having relatively large openings so that the tea bags or the like disposed therein are freely accessible to the water. However, it is obvious that by making the mesh finer, tea leaves, or the like, could also be inserted within the cylinders, as desired, without hampering or restricting the access to the water. For convenience, tea bags may be preferable. However, for suiting a particular user's taste, various types of tea leaves may be blended and used with finer mesh cylinders. However, regardless of what method is used, as far as the tea leaves, tea bags, etc, are concerned, within the cylinders 90 and 154, the cylinders are appropriately dimensioned so that their external diameter is substantially the same as the inner diameter of the narrowest opening through which they are inserted and withdrawn, so that the withdrawal action serves to clean or wipe them off. This prevents dripping, etc., after the cylinders are withdrawn.

While the apparatus 10 and the apparatus 110 have been discussed in terms of sun tea, it will be understood that the same apparatus may be used for sun coffee, etc. Appropriate bags for the coffee grounds, or else a relatively tight mesh for the cylinder will, obviously, be required.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Sun tea apparatus, comprising, in combination:
   container means for holding a quantity of water, and including a mouth portion of a first predetermined size; and
   insert means extending into the container means and into the quantity of water through the mouth opening, including
   cylinder means for containing a quantity of tea and having a plurality of apertures to allow for contact between the water and the tea and dimensioned to correspond to the first predetermined size to provide a self-wiping action as the insert means is removed from the container means, and
   means for securing the cylinder means to the container means.

2. The apparatus of claim 1 in which the insert means further includes vent means for providing atmospheric pressure within the container means.

3. The apparatus of claim 1 in which the means for securing the cylinder means to the container means includes a cap means secured to the container means.

4. The apparatus of claim 3 in which the cap means includes a spout for providing atmospheric pressure within the container means and for pouring the sun tea from the container means.

5. The apparatus of claim 1 in which the container means includes a neck portion, and the means for securing the cylinder means to the container means includes a cylindrical portion frictionally engaging the neck portion of the container means.

6. The apparatus of claim 1 in which the container means further includes a top, and the mouth portion is at the top.

7. The apparatus of claim 6 in which the insert means further includes a rim disposed on the top of the container means, and the cylinder means is secured to the rim.

8. The apparatus of claim 7 in which the insert means further includes a first cylindrical portion extending upwardly from the rim and the means for securing the cylinder means to the container means includes a second cylindrical portion extending downwardly from the rim and adapted to frictionally contact the container means.

9. The apparatus of claim 8 in which the cylinder means is secured to the rim and extends downwardly therefrom.

10. The apparatus of claim 9 in which the container means further includes a cap, and the cap is secured to the first cylindrical portion of the insert means.

11. The apparatus of claim 10 in which the insert means further includes vent means extending through the first cylindrical portion adjacent to the cap means for providing atmospheric pressure within the container means.

* * * * *